Patented Jan. 8, 1929.

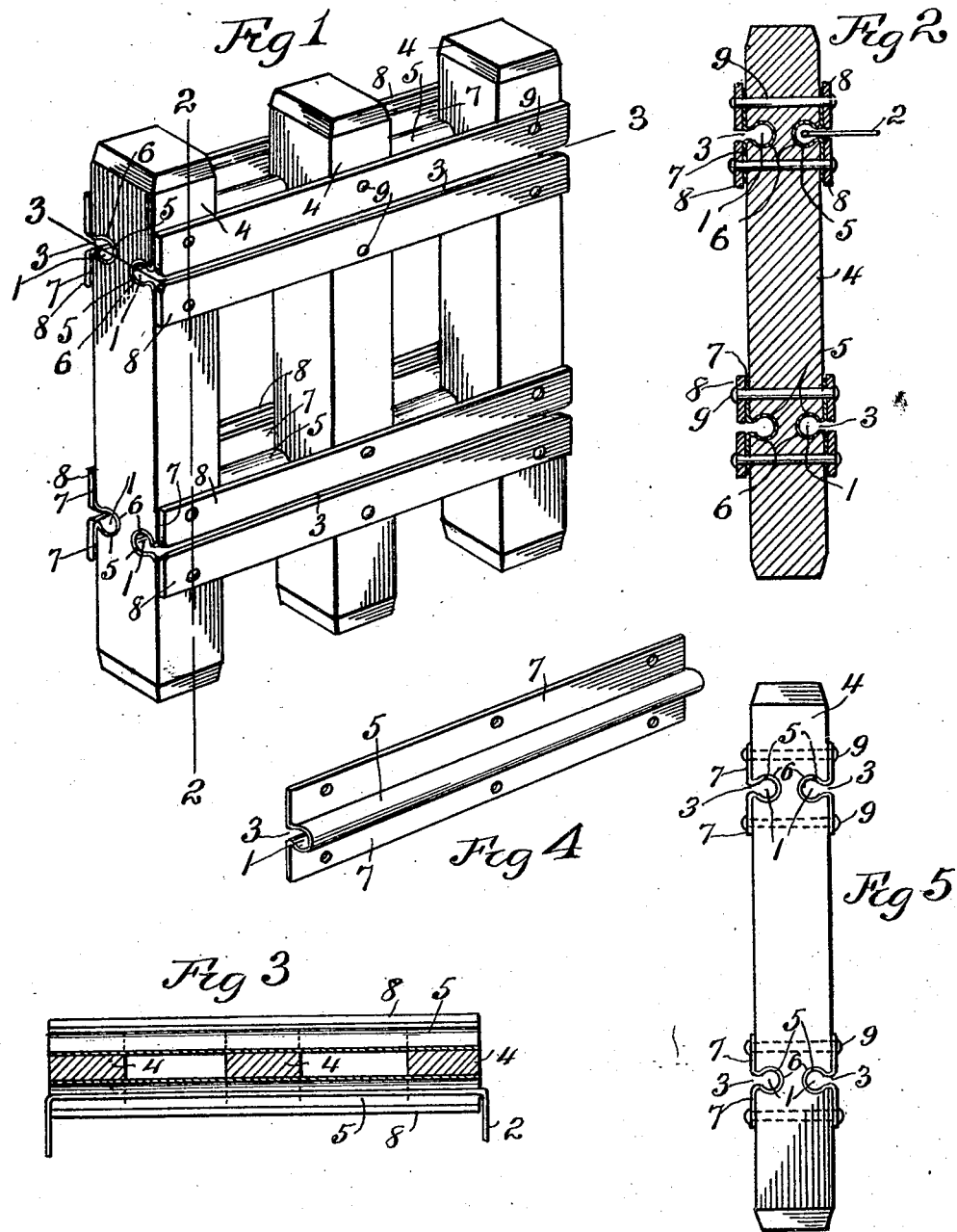

1,698,131

UNITED STATES PATENT OFFICE.

THOMAS GRAY, OF LYNDON, KANSAS.

BALING BLOCK.

Application filed March 7, 1927. Serial No. 173,455.

My invention relates to improvements in baling blocks, such as are employed to compress hay or straw in hay baling machines.

One of the objects of my invention is to provide a novel baling block which is provided with novel means for guiding the baling wires through the block at the end of a bale, so as to prevent the wires from catching on the block or protruding hay or straw.

A further object of my invention is to provide a baling block which is simple, cheap, strong, durable, not liable to get out of order, which is relatively light and easy to handle, and having means for protecting the block from the cutting and wearing action such as is usually occasioned by the block holding dogs of the baling chamber.

The novel features of my invention are hereinafter fully described and claimed.

In the accompanying drawing, which illustrates the preferred embodiment of my invention, Fig. 1 is a perspective view of my improved baling block.

Fig. 2 is a vertical section on the line 2—2 of Fig. 1, showing a baling wire in one of the guiding tubes.

Fig. 3 is a section on the line 3—3 of Fig. 1, a baling wire being shown mounted in one of the tubes.

Fig. 4 is a perspective view of one of the guiding tubes.

Fig. 5 is an edge elevation of the improved block, the re-enforcing plates being omitted.

Similar reference characters designate similar parts in the different views.

The baling block is provided adjacent to its opposite sides respectively with transverse holes 1 extending horizontally through the block for easily and conveniently guiding the baling wires, one of which is designated by 2 in Figs. 2 and 3, through the block without liability of the wires catching on the block or on hay protruding from the bale.

Opposite sides of the block are provided with horizontal transverse slots 3 respectively communicating with the holes 1 and co-extensive in length therewith. The slots 3 are each relatively narrow, so as to prevent hay or straw crowding into the guiding holes 1, and are adapted to have the baling wires pass therethrough from the holes 1.

In the preferred embodiment of my invention shown in the drawing, the baling block may comprise a plurality of spaced apart vertical members, which may be square wooden bars 4, and horizontal transverse tubes 5 respectively mounted in transverse horizontal grooves 6 with which each side of each vertical member 4 is provided.

Each tube 5 is provided in its outer side with a longitudinal slot 3 which is co-extensive with the length of the tube, and which is relatively narrow.

Each tube 5 is provided at opposite sides respectively of the slot 3 with two flanges 7 which are fastened in any suitable manner to the adjacent sides of the members 4.

The grooves 6 are arranged in pairs, the grooves of each pair being oppositely disposed in opposite sides of the members 4.

Re-enforcing plates 8 may be mounted respectively against the outer sides of the flanges 7, and fastening bolts 9 may be extended through the plates 8, flanges 7 and the members 4, as shown in Figs. 1, 2 and 3. When the re-enforcing plates 8 are used, the tubes 5 may be made of material lighter than would be used, were the plates 8 eliminated, as shown in Fig. 5.

By having the bolts 9 passing through the re-enforcing plates 8 and also through the flanges 7 of the tubes 5, one set of bolts fastens each tube 5 and each set of plates 8, thus affording a saving of bolts, and a strengthening of the block, due to elimination of bolt holes that would be required for a larger number of bolts. This construction also permits of lighter tubes 5 being used.

The ends of the plates 8 and of the tubes 5 are disposed in the paths of travel of the block holding dogs, not shown, with which the baling chamber is ordinarily provided. The plates 8 and the tubes 5 thus prevent the holding dogs from unduly cutting and wearing the block.

In the operation of the invention, the baling wires are inserted through the tubes 5 next adjacent to the end of the bale which is to be compressed. After the compression of the bale and the fastening of the ends of the baling wires, the bale is removed, the baling wires passing out of the tubes 5 through the slots 3.

The baling wires for the next bale are then inserted through the tubes 5 adjacent to the other side of the block, and through the adjacent tubes 5 of the next block, after the next bale has been compressed, following which the operation is repeated in the manner already described.

By spacing the members 4 apart a light baling block is afforded, and the plates 8 and tubes 5 afford convenient hand holds between the members 4 with which the block may be easily and conveniently handled.

By having a relatively large hole 1 and a relatively narrow slot 3 in each tube, the baling wires may be easily inserted and the material which is being compressed is prevented from entering the hole and interfering with the passing of the wires through the hole. By using metal tubes the wires are not liable to catch and may be readily slid through the tubes.

I do not limit my invention to the structure shown and described, as many modifications, within the scope of the appended claim, may be made without departing from the spirit of my invention.

What I claim is:—

A baling block having vertical spaced apart members having in the same sides alined transverse grooves, a transverse plate having a tubular portion disposed in said grooves and having two flanges respectively above and below said grooves, and provided with a longitudinal slot between said flanges and communicating with and narrower than the internal diameter of said tubular portion, two re-enforcing plates bearing respectively against the outer sides of said flanges, and bolts extending through both the plates and the flanges thereunder and through said members.

In testimony whereof I have signed my name to this specification.

THOMAS GRAY.